March 22, 1966   W. R. CLENDANIEL ET AL   3,241,775
APPARATUS AND METHOD FOR REDUCING THE SIZE OF PARTICLES
Filed Aug. 26, 1963   3 Sheets-Sheet 1
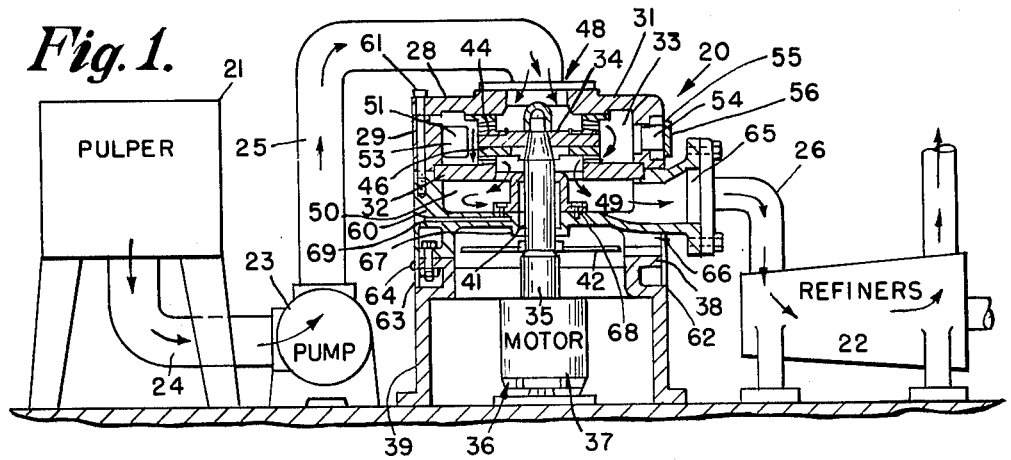
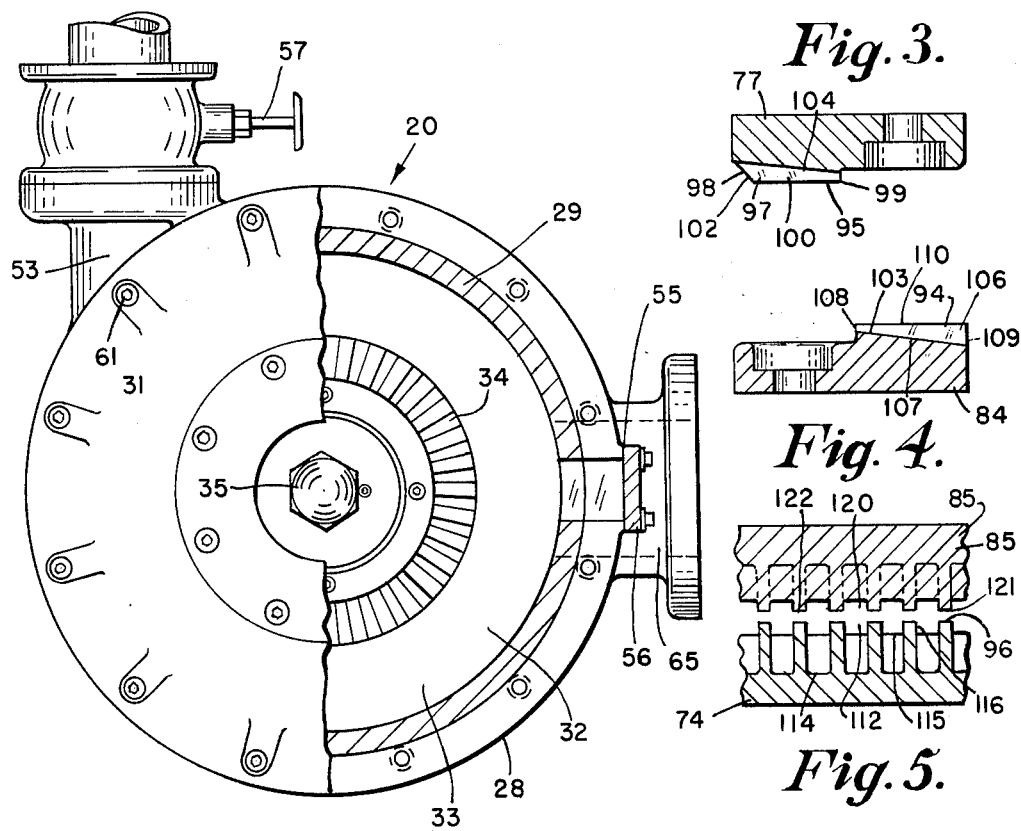
INVENTOR.
DONALD W. DANFORTH
BY W. RICHARD CLENDANIEL
Pearson + Pearson
ATTORNEYS INVENTOR.
DONALD W. DANFORTH
BY W. RICHARD CLENDANIEL
Pearson + Pearson
ATTORNEYS INVENTOR.
DONALD W. DANFORTH
BY W. RICHARD CLENDANIEL
Pearson + Pearson
ATTORNEYS United States Patent Office 3,241,775
Patented Mar. 22, 1966

3,241,775
APPARATUS AND METHOD FOR REDUCING
THE SIZE OF PARTICLES
William Richard Clendaniel and Donald W. Danforth, both of Andover, Mass., assignors to Bolton-Emerson, Inc., Lawrence, Mass., a corporation of Massachusetts
Filed Aug. 26, 1963, Ser. No. 304,492
11 Claims. (Cl. 241—21)

This invention relates to apparatus for reducing the size of particles and especially to deflakers for reducing flakes of undefibered material in paper stock to defibered condition.

Continuous systems of wet paper stock preparation conventionally move the raw material from a pulper through beaters and refiners but it has been found more efficient and less costly to interpose a specialized machine in the system for the purpose of reducing flakes in the stock to fibres.

One well known type of deflaker resembles a disc refiner in having a disc type rotor and annular stator, the stock entering axially and being discharged radially after being subjected to multiple impacts in an interface having a fixed clearance. Because the clearance is sufficiently large to avoid shortening the fibres but small enough to cause the flakes to be impacted repeatedly by the action of the rotor, the flakes are reduced to fibres without excessive use of power or loss of throughput. Unlike a disc refiner, however, such deflakers have resembled a rotary cage type disintegrator such as disclosed in U.S. Patent 2,957,795 to Stuck of October 25, 1960 in that the treatment interfaces extend axially in the form of concentric rings of teeth extending normal to the plane of the rotor and overlapping each other.

In such prior art impacting devices, the stock fed into the axial inlet has first encountered the bars or teeth of a rotor revolving at high speed and has tended to be deflected away from the treatment interface rather than into the same. In addition, the apparatus has been capable of only one pass in that the stock has been treated only on its radial outward path and then has been discharged radially or tangentially.

An object of this invention is to provide a deflaker capable of handling low or high consistency stocks, in which the stock receives a treatment in its radial outward path and then receives a second treatment in a radially inward pass.

Another object of the invention is to provide such a deflaker in which the normal friction losses, and the equilibrium of centrifugal force on both sides of the rotor are overcome by a positive feed pressure which forces the stock through the apparatus.

A further object of the invention is to provide a deflaker with at least one radially extending interface of fixed clearance, the stator plates having tapered influent channels presented to the advancing stock at the deep end of the channel for receiving the stock and directing it toward the interface and into the channels of the high speed rotor.

Still another object of the invention is to provide a novel method for deflaking paper stock wherein the stock is forced radially outwardly across one face of a rotor, then radially inwardly across the other face of the rotor and subjected to high velocity impacts in both radial paths.

A still further object of the invention is to provide a deflaker with detachable stator and rotor plates whereby two pairs of plates may be used for tough, wet strength stock at lower capacity (lower throughput) one pair of plates may be used in the influent chamber for high capacity (high throughput) and one pair of plates may be used in the effluent chamber, with an impeller in the influent chamber, for dirty stock, including high consistency of 6% or more, the impeller throwing foreign material outwardly into a peripheral collection portion of the treatment chamber.

Other objects and advantages of the invention will be apparent from the claims, the description of the drawings and from the drawings in which:

FIG. 1 is a diagrammatic view of the deflaker of the invention showing its use in a continuous stock preparation system;

FIG. 2 is an enlarged plan view of the deflaker in half section on line 2—2 of FIG. 7;

FIG. 3 is an enlarged, fragmentary sectional view showing a detachable stator plate with the flow channels of the invention;

FIG. 4 is a similar view of a detachable rotor plate of the invention;

FIG. 5 is a fragmentary view showing the flow channels of a stator plate with the deep ends presented to advancing stock;

Figure 6:
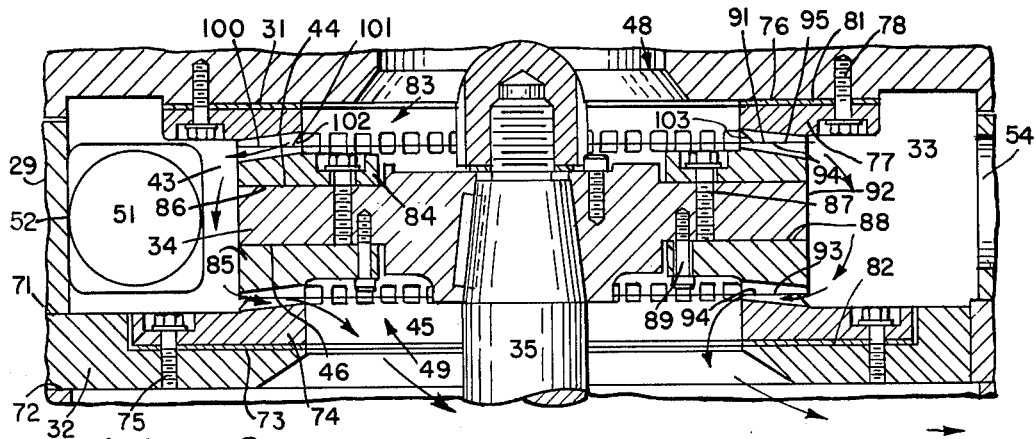
FIG. 6 is an enlarged fragmentary view of the deflaker shown in FIG. 1.
Figure 7:
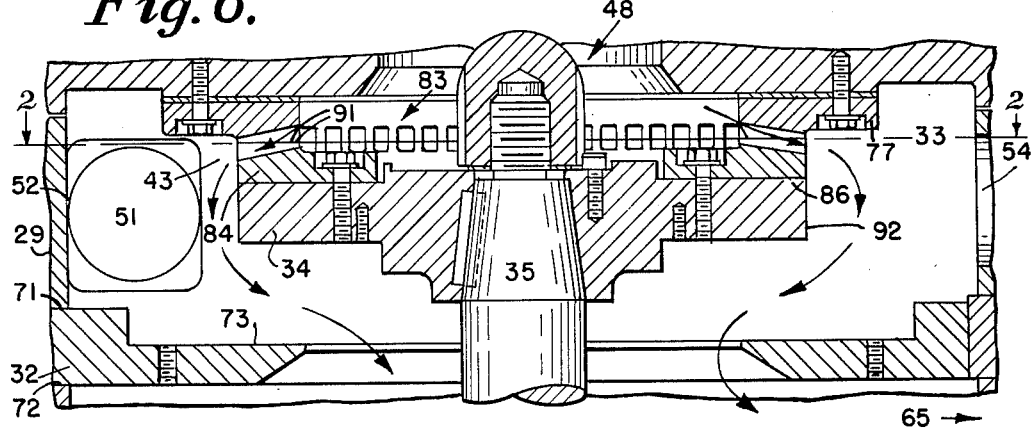
FIG. 7 is a view similar to FIG. 6 showing the deflaker of FIG. 1 with a treatment interface only in the influent chamber.

As shown in FIG. 1, the deflaker 20 of this invention may be located in a continuous wet stock preparation system including a pulper 21 and conventional refiners 22.

The stock discharged from pulper 21, which contains flakes of undefibered material, may be subjected to a pressure in the order of 75–100 p.s.i. by means external to the deflaker such as the stock pump 23. The stock, therefore, advances in the direction of the arrows despite any balancing of centrifugal forces, or pressure drop due to friction, within the deflaker. Stock pipes 24, 25 and 26 form part of the system.

The deflaker 20 includes a housing 28 having a generally cylindrical wall 29 and opposite end walls 31 and 32 which define a generally cylindrical, enclosed, pressure chamber 33 wherein the stock is deflaked. A disc type rotor 34 is mounted to revolve in a plane parallel to the end walls 31 and 32 intermediate of the chamber 33, the rotor being carried by the shaft 35 driven by rotating means 36 preferably in the form of an electric motor 37. Preferably the rotor 34 is attached directly to the shaft 35 thereby eliminating the need for external couplings and bearings and the deflaker housing 28 is mounted directly on the flange 38 of the motor housing 39 to eliminate the need for a separate base.

A mechanical seal 41, of well known type within housing 67 prevents leakage of stock from the working chamber around the motor shaft. A flinger plate 42 is provided to prevent seal purge liquid leakage from reaching the motor.

The rotor 34 divides the chamber 33 into sub chambers designated herein as influent chamber 43, between the end wall 31 and the adjacent face 44 of the rotor and effluent chamber 45, between the opposite face 46 of the rotor and end wall 32. Axial inlet means 48 is provided in end wall 31 and axial outlet means 49 is provided in end wall 32, the latter discharging into a discharge chamber 50 and thence into the pipe or conduit 26 leading to refiners 22, or to other stock preparation equipment.

The influent chamber 43 on the inlet side of rotor 34 and the effluent chamber 45 on the outlet side of the rotor both include a common, peripheral, outer portion forming a collection compartment 51 for receiving foreign material centrifugally thrown off by the rotor 34. Such material is held against the inner face 52 of the cylindrical wall 29 or works its way around the face 52 into the tangential outlet 53, there also being an inspection and clean-out port 54 with a gasket 55 and port cover 56. The outlet 53 leads to a shut-off valve 57, which may be manually or automatically opened at predetermined time intervals to flush out, or clean out the accumulation of foreign materials.

Preferably the housing 28 is formed of readily detachable units comprising the base 60, the cylindrical wall 29 and the end wall 31 assembled into a unit by the bolts 61. The base 60, is fixed to the motor housing flange 38 by bolts 62, the joint being covered by a cylindrical shroud 63 held in place by screws 64. The base 60 includes the discharge chamber 50, the treated stock outlet 65 which connects with pipe 26 and the drain outlet 66 for any leakage received on flinger plate 42. The sealed housing 67 around rotor shaft 35 is mounted on base 60 by bolts 68 and includes the passage 69 for incoming pressurized sealing liquid.

The cylindrical wall 29, and base 60 both include right angular seats 71 and 72 jointly forming a peripheral groove for receiving and clamping the annular end wall 32, the end wall 32 having an annular seat 73 for receiving a detachable, annular stator plate 74 by means of bolts 75. The end wall 31 includes a seat 76 for a corresponding detachable annular stator plate 77 held in place by bolts 78. It should be noted that shims 81 and 82 may be mounted under the stator plates 74 and 77 to adjust clearance with the inlet and outlet sides of the rotor 34 to compensate for wear or the like.

The stock treatment means 83 of the invention includes the detachable annular stator plates 74 and 77 and the detachable annular rotor plates 84 and 85, plate 84 being mounted on the inlet face, or side, 86 of rotor 34 by bolts 87 and plate 85 being mounted on the outlet, or opposite face or side 88 of rotor 34, by bolts 89. It will be seen that pressurized stock from the pump 23 is fed to deflaker 20 through axial inlet means 48 and advanced radially outwardly through the treatment interface 91 between rotor plate 84 and stator plate 77 in the influent chamber 43, then around the rim 92 of rotor 34 and radially inwardly through the treatment interface 93 between rotor plate 85 and stator plate 74 into the effluent chamber 45 for discharge from axial outlet means 49. The stock thus receives both an outward pass and an inward pass and the treatment effect can be identical, or different, in each pass, depending on the structure of the plates.

The interface 91 is formed by a treatment face 94 on rotor plate 84 and a treatment face 95 on stator plate 77, the clearance therebetween being not less than the diameter of the fibres in the stock, since the treatment desired is the reduction of flakes to individual fibres rather than the cutting or shortening of fibres as in a refiner. The treatment face 95, and the corresponding treatment face 96 on stator plate 74 is provided with influent stock conduit means constituting stationary, convergent nozzles formed by a multiplicity of spaced, generally radial, tapered, alternate ribs 100 and flow channels 97, each flow channel having a deep end 98 and a shallow end 99, and the portion of the plate between the channels forming the ribs, or bars, 100. For example a stator plate of nine inches in diameter may have 72 equally spaced flow channels and 72 corresponding ribs, while a twelve inch diameter stator plate may have 102 such channels and ribs, the channels being about one-sixteenth of an inch deep at the shallow ends 99, three-sixteenths to seven-sixteenths deep at the deep ends 98 depending on the diameter of the stator plate, the channels being about three-sixteenths of an inch in width with parallel side walls 101 and 102 and the ribs having side walls tapering from about two-sixteenths of an inch wide at the inside to about three-sixteenths of an inch wide at the outside.

It should be noted that the deep ends 98 of the flow channels in stator plate 77 are on the inside periphery, and that the ribs 100 are relieved at 102 to define an inner peripheral groove 103, for receiving advancing stock in stationary flow channels, between stationary ribs, which are substantially equal in cross sectional area to the cross sectional area of the path of the influent stock.

Only after entering the stationary flow channels, is the stock directed by the tapered bottom 104 of the channels into the interface 91 for treatment and then into the rotor channels which are rotating at high speed such as 3600 r.p.m. The flow channels 106 in the treatment face 94 of rotor plate 84 are also tapered, with an inclined bottom 107, a shallow end 108 forming part of the inner peripheral groove 103 and a deep effluent end 109 at the rim 92 of the rotor. The flow channels 106 are spaced at equal distances apart and generally similar in dimensions to the flow channels 97, to form a multiplicity of ribs 110 corresponding to ribs 100. Stock directed radially into flow channels 97 and then guided axially across the radially extending interface 91 is subjected to high velocity impacts from the rapidly revolving annular set, or pattern, of ribs, or blades 110 and then discharged from the deep ends 109 of the rotor flow channels.

The flow channels 112 in the treatment face 96 of the stator plate 74, are the reverse of the channels in stator plate 77, in that the deep ends 113 are at the outer periphery, with the inclined bottom 114 of each channel terminating in a shallow end 115 at the inner periphery. The ribs 116 are relieved at 117 to define a peripheral entrance groove 118. The flow channels 120 in the treatment face 121 of rotor plate 85, the ribs 122 thereon and the dimensions of the parts all correspond to the parts of rotor plate 84 except that the shallow ends 123 are on the outer periphery and the deep effluent ends 124 are on the inner periphery to deliver treated stock to the axial outlet means 49.

The readily detachable sectional housing 28, with its detachable cylindrical wall 61, detachable end walls 31 and 32, detachable stator plates 74 and 77 and detachable rotor plates 84 and 85 constitutes a versatile deflaker in which a great variety of deflaking can be accomplished. The performance of the apparatus is dependent on the type of material being processed, some materials being more difficult to deflake and defibre than others. When performance requirements are low, for example, on easily defibered stock, on small incoming flakes, or when incomplete defibering is acceptable, high capacity is possible. On the other hand, when high performance is required, for example, on tough wet strength stock, lower production rates may be necessary. Similarly on stocks which may be dirty with considerable tramp metal and other foreign material therein, relatively high performance and capacity may be achieved while also cleaning the stock even at consistencies of 6% or more.

As shown in FIGURE 6, in the preferred embodiment, two stator plates and opposite rotor plates are used for high performance and lower capacity to deflake materials which are difficult to defiber. The centrifugal forces created by the rotor in the influent and effluent chambers tend to balance each other and there is a pressure loss due to friction, but the inlet pressure is sufficiently high, in the order of 75–100 p.s.i., to force the stock through the apparatus. It will be understood that the capacity of the deflaker 20 will be dependent on the differential pressure (inlet pressure less outlet pressure) the consistency of the stock and the rotor stator open area. Maximum capacity with regard for performance will be dependent primarily on the nature of the material, the size of the incoming flakes and the acceptable condition of outgoing stock.

An embodiment of the deflaker 20, is shown in FIG-

URE 7, which provides a high capacity (high throughput) for use on material which is relatively easy to deflake and defibre. The lower rotor plate 85 and the lower stator plate 74 have been removed, so that there is only one treatment interface at 91 and so that the stock receives only a single pass. If desired, a filler ring, substantially equal in cross section to, and filling only, the seats 71 and 72, can be used in place of endwall 32 to permit stock to travel directly from the interface to the outlet 65.

In this embodiment, at moderate to low flow rates, a positive pumping action is generated which promotes flow. The use of external pumping means, therefore, is not essential.

Figure 8:
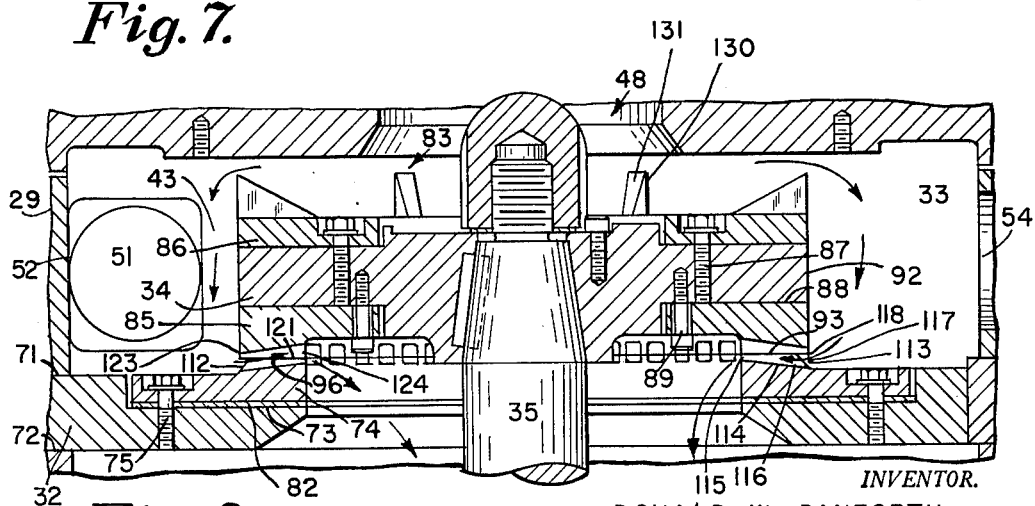
FIG. 8 is a view similar to FIG. 6 showing the deflaker of FIG. 1 with an impeller in the influent chamber and a treatment interface only in the effluent chamber.
Figure 9:
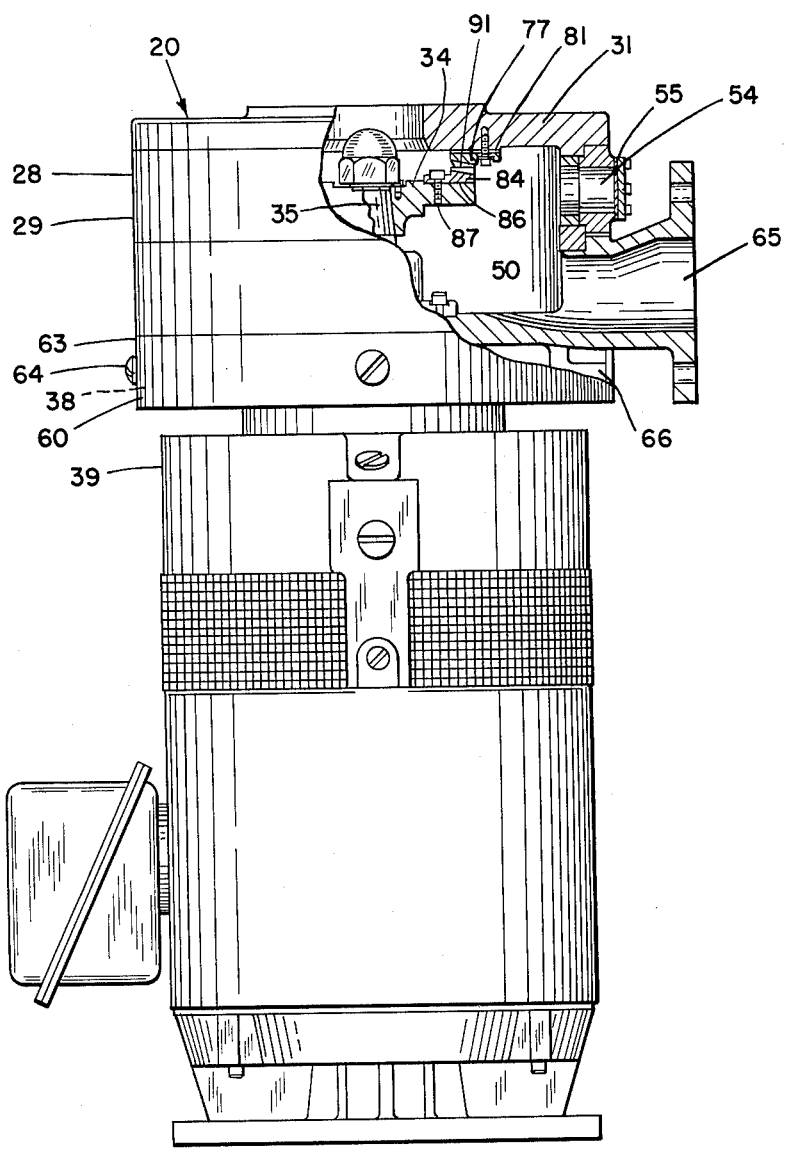
FIG. 9 is a side elevation, partly in section of a commercial embodiment of the apparatus of the invention, as it may be used for single pass treatment to reduce the size of particles.

An embodiment of the deflaker 20 is shown in FIGURE 8 which is specifically designed to simultaneously (1) defiber fibrous material in the stock by passage through the interface 93 formed by the lower rotor plate 85 and the lower stator plate 74 and (2) separate high specific gravity and/or low specific area foreign materials in the stock. The latter are subjected to high centrifugal force imparted by the pumping impeller 130 and thereby thrown outwardly to the periphery of chamber 33 for subsequent deposition in the tangential trash collection compartment 51 from whence they may be removed intermittently, or continuously, through valve 57. The upper stator plate 77 has been removed to permit free passage of the foreign materials into chamber 33 and the impeller 130 consists preferably of eight blades 131, radially oriented, of the shape depicted in FIGURE 8.

It has been found that even with high consistency stocks of 6% or more the cleaning of dirt, pebbles, tramp metal and the like is unusually effective and permits such stock to be deflaked in the interface 93 without damaging the treatment means. In addition, downstream equipment in the system, such as refiners working on close tolerances are also protected from injury.

It should also be noted that the treatment interfaces 91 and 93 are parallel to the endwalls 31 and 32 and to the plane of rotation of rotor 34 and that in all embodiments of the device, the stock is always treated in at least one radially extending interface with the stock delivered thereto from stationary, stator channels. Also that the deflaker 20, while vertically disposed for saving floor space, could be horizontally disposed if desired, by mounting the same on a horizontally disposed motor housing.

While the deflaker of the invention has been shown and described in what is believed to be the most practical embodiments, it is recognized that departures may be made therefrom within the scope of the invention without departing from the spirit of the invention. The invention, therefore, is not to be limited to the details disclosed herein but is to be accorded the full scope of the claims.

We claim:

1. Apparatus for particle size reduction, said apparatus comprising;
    a housing having an enclosed stock treatment, pressure chamber, an end wall with an axial stock inlet and an opposite end wall with an axial stock outlet;
    a rotor mounted within said chamber to rotate in a plane parallel to said endwalls;
    means for rotating said rotor;
    means for feeding stock under pressure into said axial inlet and advancing said stock in a path radially outwardly around the rim of said rotor and then radially inwardly for discharge from said axial outlet;
    an annular stator plate fixed within said housing to one of said endwalls, said plate having a stock treatment face;
    a rotor plate fixed to said rotor, said plate having a stock treatment face opposed to the stock treatment face of said stator;
    a multiplicity of circumferentially spaced, generally radial, alternate ribs and flow channels in the opposed stock treatment faces of said plates forming a stock treatment interface normal to the axis of said rotor and in the path of said advancing stock;
    and a tapered channel bottom between each adjacent pair of ribs on said stator plate, each said channel bottom having an influent end at a spaced distance from the plane of said interface to form a stationary stock entrance substantially equal in cross sectional area to the cross sectional area of the path of the influent stock and having an effluent end substantially in the plane of said interface, for forming a stationary convergent nozzle in each said channel directing said stock into the treatment face of said rotor;
    whereby the particles in said stock are received in said stationary stator flow channels, free of rotational effect from said rotor, and are then directed from said channels across said interface into rotary impacting contact with said rotor.

2. Apparatus as specified in claim 1 wherein the ribs of said stator are relieved at the influent ends thereof and outline an annular, peripheral recess for receiving particles in the stock advancing along said path.

3. Apparatus as specified in claim 1 wherein said flow channels are about one-sixteenth inch in width and spaced about one-sixteenth of an inch apart on each said plate and said rotating means drives said rotor at about 3600 r.p.m.;
    whereby said stock is subjected to a relatively large number of high velocity impacts per minute at said interface.

4. Apparatus as specified in claim 1 wherein said plates are about nine to twelve inches in outside diameter, there are about seventy-two to one hundred and two said ribs and channels therein, the tapered flow channels in said plates are about one-sixteenth of an inch in width, spaced apart about one-sixteenth of an inch, about one-sixteenth of an inch in depth at the effluent end and about three-sixteenths of an inch in depth at the influent end.

5. Apparatus as specified in claim 1 wherein said stator plate is on the said inlet endwall, and said rotor plate is opposed thereto on the inlet side of said rotor and the outlet side of said rotor is free of impeller elements
    whereby the centrifugal pumping action of said rotor, augments said feeding means in moving said stock through said chamber, substantially free of any counter centrifugal force created by the opposite face of said rotor.

6. Apparatus as specified in claim 1 plus a second stator plate on the other said endwall of said housing and a second rotor plate on said rotor forming a second interface with said second stator plate, said plates having said alternate ribs, flow channels and tapered channel bottoms therein.

7. Apparatus as specified in claim 1 plus a peripheral collection compartment extending circumferentially around the portion of said chamber between said inlet endwall and the adjacent face of said rotor and impeller vanes on said adjacent face for centrifugally directing heavy particles in said stock into said compartment;
    said stator plate being fixed to the said endwall having said stock outlet and said rotor plate being opposed thereto to form said interface therewith;
    whereby said stock is cleaned in the radially outward portion of its path and impacted for particle size reduction in the radially inward portion of its path through said treatment chamber.

8. In apparatus for treating paper stock of the type having a disc rotor revolving in the space between two stators the combination of pump means, external to said apparatus, feeding paper stock under pressure thereinto, and advancing said stock along a path from the axis of said rotor radially outwardly to the rim thereof and then radially inwardly to said axis for effluent discharge therefrom;

treatment means on at least one said stator, and on the face of said rotor opposite thereto, said means including a treatment interface in a radial portion of said path;

and a plurality of alternate, radially extending, ribs and flow channels forming the treatment face of said stator, said channels each having an inclined bottom extending from an influent end at a spaced distance from said interface to an effluent end substantially in the plane of said interface, said ribs and channels presenting a stationary stock entrance to flakes in said stock, receiving and directing said flakes, free of rotational effect from said rotor, across said interface into impacting contact with the treatment means on said rotor.

9. In apparatus for treating paper stock of the type having a disc rotor revolving in the space between two stators, the combination of:

axial inlet means in one said stator and axial outlet means in the other said stator for substantially balancing centrifugal pumping action on each opposite face of said rotor;

external pumping means feeding stock to said inlet means and advancing the same along a path extending radially outwardly around said rotor and then radially inwardly for discharge from said outlet means;

treatment interface means in each outward and inward radial portion of said path, said means including a multiplicity of alternate ribs and flow channels extending generally radially in an annular pattern around each said stator and around each opposite face of said rotor to form a pair of opposite, substantially centrifugally balanced, stock treatment interfaces on said rotor, and influent stock conduit means on each said stator comprising stationary, convergent nozzles formed by an inclined channel bottom between each adjacent pair of ribs thereon, each said channel bottom being angularly disposed to the plane of said treatment interfaces and extending from an influent end at a predetermined spaced distance from the plane of said interface to an effluent end substantially in the plane of said interface, said stationary nozzles forming a stationary stock entrance substantially equal in cross sectional area to the cross sectional area of the path of the influent stock and said channel bottoms directing said stock toward and across the plane of said interface for impacting by said rotor.

10. A deflaker comprising:

a housing having an cylindrical wall and opposite end walls, said walls defining an enclosed pressure chamber;

inlet means in one said endwall and outlet means in the other said endwall;

a rotor mounted to revolve in a plane parallel to said endwalls within said chamber;

means for driving said rotor;

means for feeding stock under pressure from said inlet means radially outwardly around said rotor and then radially inwardly to said outlet means;

an annular set of alternate ribs and flow channels mounted within said chamber, on one said endwall;

an annular set of alternate blades and flow channels mounted on said rotor to form a stock treatment interface with said stator ribs;

and an inclined channel bottom in each said flow channel, angularly disposed to said stock treatment interface, and extending from an influent end at a spaced distance from the plane of said interface to an effluent end substantially in the plane of said interface;

said stator channels constituting stationary, convergent nozzles receiving stock at the influent ends thereof and directing said stock across said interface into the blades of said rotor.

11. The method of deflaking paper stock in apparatus having a disc rotor rotatable in a fixed plane within an enclosed housing to form a radially extending influent chamber on one side of the rotor and a radially extending effluent chamber on the other side of the rotor, said method comprising the steps of:

pumping said stock under pressure axially into said influent chamber to advance radially outwardly therein, around said rotor and radially inwardly, through said effluent chamber, for axial discharge therefrom;

rotating said rotor at high speed in the order of about 3600 r.p.m.;

channeling said radially advancing stock progressively toward the plane of rotation of said rotor, free of forces tending to rotate said stock in a path around the axis of said rotor, until said stock is engaged by said rotor, and then subjecting the stock, so engaged by said rotor, to a number of high velocity impacts per minute corresponding to said rotor speed to deflake said stock, while subjecting said stock to said forces tending to rotate said stock in a path around the axis of said rotor.

References Cited by the Examiner
UNITED STATES PATENTS

| | | | |
|---|---|---|---|
| 382,747 | 5/1888 | Ames | 241—296 |
| 443,295 | 12/1890 | Poulin | 241—257 X |
| 2,044,480 | 6/1936 | Lord | 241—162 |
| 2,572,373 | 10/1951 | Niethamer | 241—260 |

ROBERT C. RIORDON, *Primary Examiner.*

J. SPENCER OVERHOLSER, *Examiner.*